United States Patent [19]

Calundann

[11] 4,256,624
[45] Mar. 17, 1981

[54] POLYESTER OF 6-HYDROXY-2-NAPHTHOIC ACID, AROMATIC DIOL, AND AROMATIC DIACID CAPABLE OF UNDERGOING MELT PROCESSING

[75] Inventor: Gordon W. Calundann, North Plainfield, N.J.

[73] Assignee: Celanese Corporation, New York, N.Y.

[21] Appl. No.: 54,049

[22] Filed: Jul. 2, 1979

[51] Int. Cl.$^3$ ............... C08G 63/60; C08G 63/66; C08G 63/68
[52] U.S. Cl. ..................... 260/40 R; 260/40 P; 528/173; 528/190; 528/271
[58] Field of Search ............... 528/190, 173, 271; 260/40 R, 40 P

[56] References Cited
U.S. PATENT DOCUMENTS

| | | | |
|---|---|---|---|
| 3,778,410 | 12/1973 | Kuhfuss et al. | 528/190 |
| 4,067,852 | 1/1978 | Calundann | 528/190 |
| 4,083,829 | 4/1978 | Calundann et al. | 528/190 |
| 4,161,470 | 7/1979 | Calundann | 528/190 |
| 4,169,933 | 10/1979 | Jackson, Jr. et al. | 528/190 |

*Primary Examiner*—Lester L. Lee
*Attorney, Agent, or Firm*—Kenneth A. Genoni

[57] ABSTRACT

A novel polyester is provided which has been found to exhibit an optically anisotropic melt phase which enables it readily to undergo melt processing to form quality fibers, films, molded articles, etc. The polyester of the present invention contains recurring 6-oxy-2-naphthoyl moieties in addition to moieties derived from at least one aromatic diol and at least one aromatic diacid in the proportions indicated. The hydrogen atoms present upon the aromatic rings of these moieties optionally may be at least partially substituted (as described). The wholly aromatic polyester is capable of forming the desired anisotropic melt at a temperature below approximately 400° C., and in a particularly preferred embodiment at a temperature below approximately 320° C.

35 Claims, No Drawings

POLYESTER OF 6-HYDROXY-2-NAPHTHOIC ACID, AROMATIC DIOL, AND AROMATIC DIACID CAPABLE OF UNDERGOING MELT PROCESSING

BACKGROUND OF THE INVENTION

Wholly aromatic polyester resins long have been known. For instance, 4-hydroxybenzoic acid homopolymer and copolymers have been provided in the past and are commercially available. Those wholly aromatic polyesters normally encountered in the prior art have tended to be somewhat intractable in nature and to present substantial difficulties if one attempts to melt process the same while employing conventional melt processing procedures. Such polymers commonly are crystalline in nature, relatively high melting or possess a decomposition temperature which is below the melting point, and when molten frequently exhibit an isotropic melt phase. Molding techniques such as compression molding or sintering may be utilized with such materials; however, injection molding, melt spinning, etc., commonly have not been viable alternatives or when attempted commonly have been accomplished with difficulty.

Representative publications which discuss wholly aromatic polyesters include: (a) *Polyesters of Hydroxybenzoic Acids*, by Russell Gilkey and John R. Caldewell, J. of Applied Polymer Sci., Vol. II, Pages 198 to 202 (1959), (b) *Polyarylates (Polyesters From Aromatic Dicarboxylic Acids and Bisphenols)*, by G. Bier, Polymer, Vol. 15, Pages 527 to 535 (August 1974), (c) *Aromatic Polyester Plastics*, by S. G. Cottis, Modern Plastics, Pages 62 to 63 (July 1975); and (d) *Poly(p-Oxybenzoyl Systems): Homopolymer for Coatings: Copolymers for Compression and Injection Molding*, by Roger S. Storm and Steven G. Cottis, Coatings Plast. Preprint, Vol. 34, No. 1, Pages 194 to 197 (April 1974). See also, U.S. Pat. Nos. 3,039,994; 3,169,121; 3,321,437; 3,553,167; 3,637,595; 3,651,014; 3,723,388; 3,759,870; 3,767,621; 3,778,410; 3,787,370; 3,790,528; 3,829,406; 3,890,256; and 3,975,487.

Also, it more recently has been disclosed that certain polyesters may be formed which exhibit melt anisotropy. See for instance, (a) *Polyester X7G-A Self Reinforced Thermoplastic*, by W. J. Jackson Jr., H. F. Kuhfuss, and T. F. Gray, Jr., 30th Anniversary Technical Conference, 1975 Reinforced Plastics/Composites Institute. The Society of the Plastics Industry, Inc., Section 17-D, Pages 1 to 4, (b) Belgian Pat. Nos. 838,935 and 828,936, (c) Dutch Pat. No. 7505551, (d) West German Pat. Nos. 2520819, 2520820, 27222120, 2834535, 2834536 and 2834537, (e) Japanese Pat. Nos. 43-223; 2132-116; and 3021-293, (f) U.S. Pat. Nos. 3,991,013;; 3,991,014; 4,057,597; 4,066,620; 4,067,852; 4,075,262; 4,083,829; 4,118,372; 4,130,545; 4,130,702; and 4,156,070; and (g) U.K. application No. 2,002,404. See also commonly assigned U.S. Ser. Nos., 877,917, filed Feb. 15, 1978; (now U.S. Pat. No. 4,184,996) 10,392, filed Feb. 8, 1979, and 10,393, filed Feb. 8, 1979.

Additionally, in my commonly assigned U.S. Ser. No. 834,993, filed Oct. 20, 1977, (now U.S. Pat. No. 4,161,470) is claimed of polyester of 6-hydroxy-2-napthoic acid and para-hydroxy benzoic acid, and in my commonly assigned U.S. Ser. No. 32,086, filed Apr. 23, 1979 is claimed a polyester of 6-hydroxy-2-naphthoic acid, para-hydroxy benzoic acid, aromatic diol, and aromatic acid. Each of these polyesters exhibits an anisotropic melt phase and is capable of readily undergoing melt processing.

OBJECTS OF THE INVENTION

It is an object of the present invention to provide an improved melt processable wholly aromatic polyester which commonly can be formed on a more economical basis than that claimed in my U.S. Ser. No. 834,993, filed Oct. 20, 1977 (now U.S. Pat. No. 4,161,470).

It is an object of the present invention to provide an improved wholly aromatic polyester which is suited for the formation of quality molded articles, melt extruded fibers, and melt extruded films.

It is an object of the present invention to provide an improved melt processable wholly aromatic polyester capable of forming an anisotropic melt phase at a temperature below approximately 400° C., and preferably below approximately 320° C.

It is an object of the present invention to provide an improved wholly aromatic polyester which forms a highly tractable melt phase.

It is an object of the present invention to provide an improved wholly aromatic polyester which forms an anisotropic melt phase at a temperature well below its decomposition temperature and which may form quality high performance fibers.

It is an object of the present invention to provide improved wholly aromatic polyester fibers which particularly are suited for use as fibrous reinforcement in a rubber matrix.

It is another object of the present invention to provide an improved wholly aromatic polyester which readily may be melt extruded to form a film.

It is another object of the present invention to provide an improved wholly aromatic polyester which readily may be injection molded to form a molded article (which optionally may be fiber and/or filler reinforced).

These and other objects, as well as the scope, nature and utilization of the present invention will be apparent to those skilled in the art from the following detailed description.

SUMMARY OF THE INVENTION

It has been found that a melt processable wholly aromatic polyester capable of forming an anisotropic melt phase at a temperature below approximately 400° C. consists essentially of the recurring moieties I, II, and III which may include substitution of at least some of the hydrogen atoms present upon an aromatic ring wherein:

I is

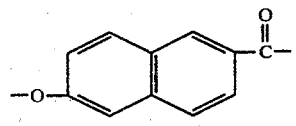

II is a dioxy aryl moiety of the formula $+O-Ar-O+$
where Ar is a divalent radical comprising at least one aromatic ring, and III is a dicarboxy aryl moiety of the formula

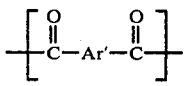

where Ar' is a divalent radical comprising at least one aromatic ring,
with said optional substitution if present being selected from the group consisting of an alkyl group of 1 to 4 carbon atoms, an alkoxy group of 1 to 4 carbon atoms, halogen, a phenyl group, and mixtures of the foregoing, and wherein said polyester comprises approximately 10 to 90 mole percent of moiety I, approximately 5 to 45 mole percent of moiety II, and approximately 5 to 45 percent of moiety III.

DESCRIPTION OF PREFERRED EMBODIMENTS

The wholly aromatic polyester of the present invention consists essentially of at least three recurring moieties which when combined in the polyester have been found to form an atypical optically anisotropic melt phase at a temperature below approximately 400° C. and preferably below approximately 350° C. (e.g., below approximately 320° C.). Such aromatic polyester in most but not all embodiments of the present invention is crystalline in nature. The polymer melting temperatures may be confirmed by the use of a differential scanning calorimeter (i.e., DSC) employing repeat scans at a 20° C. per minute heat-up rate and observing the peak of the DSC melt transition. The crystalline polyester commonly exhibits a melting point of at least 250° C. and preferably of at least 260° C. as determined by differential scanning calorimetry. Because of its ability to exhibit anisotropic properties (i.e., liquid crystalline properties) in the melt, the polyester readily can form a product having a highly oriented molecular structure upon melt processing. Preferred polyesters are capable of undergoing melt processing at a temperature in the range of approximately 300 to 320. The usual difficulties incurred when one attempts to melt process aromatic polyesters by conventional melt processing techniques effectively are eliminated. The aromatic polyester is considered to be "wholly" aromatic in the sense that each moiety present in the same contributes at least one aromatic ring to the polymer backbone.

The wholly aromatic polyester comprises three essential moieties. Moiety I can be termed a 6-oxy-2-naphthoyl moiety and possesses the structural formula:

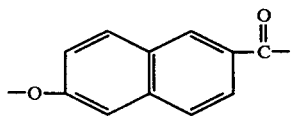

While not specifically illustrated in the structural formula, at least some of the hydrogen atoms present upon the aromatic rings of moiety I may be substituted. Representative ring substituted compounds from which moiety I can be derived include: 6-hydroxy-5-chloro-2-naphthoic acid, 6-hydroxy-5-methyl-2-naphthoic acid, 6-hydroxy-5-methoxy-2-naphthoic acid, 6-hydroxy-7-chloro-2-naphthoic acid, 6-hydroxy-4,7-dichloro-2-naphthoic acid, etc. The presence of ring substitution tends to modify to some degree the physical properties of the resulting polymer (e.g., the polymer may soften at a lower temperature, its impact strength may be improved, and the crystallinity of the solid polymer may be decreased). In a preferred embodiment wherein a polyester of optimum cyrstallinity in the solid state is desired, no ring substitution is present.

As will be apparent to those skilled in the art, moiety I can be derived from unsubstituted 6-hydroxy-2-naphthoic acid and the derivatives thereof. A convenient laboratory preparation for forming 6-hydroxy-2-naphthoic acid is described in Berichte, Vol. 58, 2835-45 (1925) by K. Fries and K. Schimmelschmidt which is herein incorporated by reference. Also, U.S. Pat. No. 1,593,816 is concerned with a process for synthesizing 6-hydroxy-2-naphthoic acid by reacting carbon dioxide with the potassium salt of betanaphthol.

Moiety I comprises approximately 10 to 90 mole percent of the wholly aromatic polyester. In a preferred embodiment moiety I is present in a concentration of approximately 20 to 80 mole percent, and most preferably in a concentration of approximately 60 to 80 mole percent (e.g., approximately 70 mole percent).

The second essential moiety (i.e., moiety II) is a dioxy aryl moiety of the formula $+O-Ar-O+$ where Ar is a divalent radical comprising at least one aromatic ring. Moiety II preferably is symmetrical in the sense that the divalent bonds which join the moiety to other moieties in the main polymer chain are symmetrically disposed on one or more aromatic rings (e.g., are para to each other or diagonally disposed when present on a naphthalene ring). Moiety II comprises approximately 5 to 45 mole percent of the aromatic polyester, and preferably approximately 10 to 40 mole percent, and most preferably approximately 10 to 20 mole percent (e.g., approximately 15 mole percent). Preferred moieties which may serve as a symmetrical dioxy aryl moiety in the aromatic polyester of the present invention include:

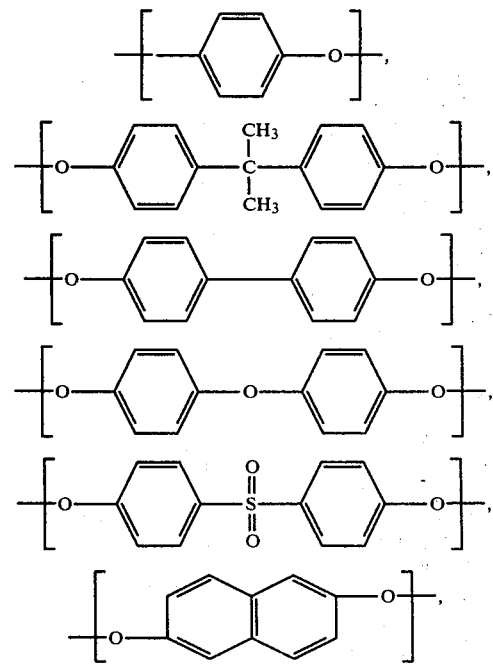

and mixtures of the foregoing. Highly satisfactory polymers can be formed wherein the aryl moiety is free of ring substitution.

The particularly preferred dioxy aryl moiety is:

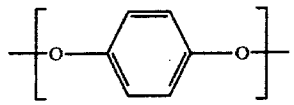

which readily may be derived from hydroquinone. Representative examples of ring substituted compounds from which moiety II can be derived include methylhydroquinone, chlorohydroquinone, bromohydroquinone, phenylhydroquinone, etc. An example of a non-symmetrical dioxy aryl moiety is that derived from resorcinol.

The third essential moiety (i.e., moiety III) is a dicarboxy aryl moiety of the formula

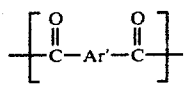

where Ar' is a divalent radical comprising at least one aromatic ring. Moiety III preferably is symmetrical in the sense that the divalent bonds which join the moiety to other moieties in the main polymer chain are symmetrically disposed on one or more aromatic rings (e.g., are para to each other or diagonally disposed, i.e., 2 and 6 positions, when present on a naphthalene ring). Moiety III comprises approximately 5 to 45 mole percent of the aromatic polyester, and preferably approximately 10 to 40 mole percent, and most preferably approximately 10 to 20 mole percent (e.g., approximately 15 mole percent). Preferred moieties which may serve as a symmetrical dicarboxy aryl moiety in the aromatic polyester of the present invention include:

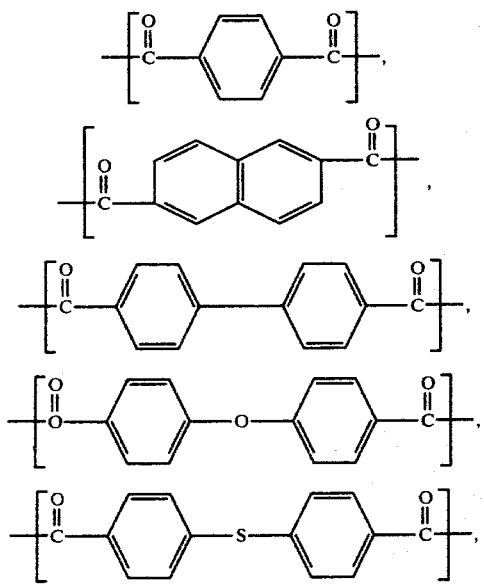

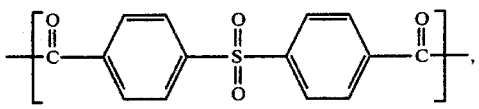

and mixtures of the foregoing.

The particularly preferred symmetrical dicarboxy aryl moiety is:

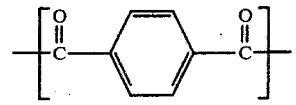

which readily may be derived from terephthalic acid. An example of non-symmetrical dicarboxy aryl moiety is that derived from isophthalic acid. Minor concentrations (e.g., 10 mole percent or less) of other aryl hydroxy acids (e.g., para-hydroxy benzoic acid or meta-hydroxy benzoic acid) optionally can be included in the wholly aromatic polyester. As will be apparent to those skilled in the art, the total molar quantities of dioxy units and dicarboxy units present within the wholly aromatic polyester will be substantially equal.

The wholly aromatic polyester of the present invention commonly exhibits

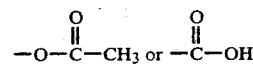

end groups depending upon the synthesis route selected. As will be apparent to those skilled in the art, the end groups optionally may be capped, e.g., acidic end groups may be capped with a variety of alcohols, and hydroxyl end groups may be capped with a variety of organic acids. For instance, end capping units such as phenylester

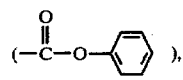

and methylester

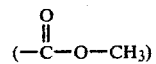

optionally may be included at the end of the polymer chains. The polymer also may be oxidatively cross-linked to at least some degree, if desired by heating in a oxygen-containing atmosphere (e.g., in air) while in bulk form or as a previously shaped article at a temperature below its melting point for a limited period of time (e.g., for a few minutes).

The wholly aromatic polyesters of the present invention tend to be substantially insoluble in all common polyester solvents, such as hexafluroisopropanol and o-chlorophenol, and accordingly are not susceptible to solution processing. They can surprisingly be readily processed by common melt processing techniques as discussed hereafter. Most compositions are soluble to some degree in pentafluorophenol.

The wholly aromatic polyester of the present invention commonly exhibits a weight average molecular weight of about 2,000 to 200,000, and preferably about 10,000 to 50,000, e.g., about 20,000 to 25,000. Such molecular weight may be determined by standard techniques not involving the solutioning of the polymer, e.g., by end group determination via infra red spectroscopy on compression molded films. Alternatively, light scattering techniques in a pentafluorophenol solution may be employed to determine the molecular weight.

The wholly aromatic polyester prior to heat treatment additionally commonly exhibits an inherent viscosity (i.e., I.V.) of at least approximately 2.5, and preferably at least approximately 3.5 (e.g., approximately 3.5 to 7.5) when dissolved in a concentration of 0.1 percent by weight in pentafluorophenol at 60° C.

The wholly aromatic polyesters of the present invention commonly may be considered crystalline in the sense that fibers melt extruded therefrom exhibit x-ray diffraction patterns using Ni-filtered CuK$\alpha$ radiation and flat plate cameras characteristic of polymeric crystalline materials. In those embodiments wherein aromatic ring substitution is present as previously described or certain aryl diols or diacids are present such as 4,4'-dicarboxydiphenylsulfone or 2,2-bis[4-hydroxyphenyl] propane the polyesters may be substantially less crystalline in the solid phase and exhibit diffraction patterns typical of oriented amorphous fibers. In spite of the crystallinity commonly observed, the wholly aromatic polyester of the present invention nevertheless may be easily melt processed in all instances.

Unlike the aromatic polyesters commonly encountered in much of the prior art, the wholly aromatic polyester of the present invention is not intractable and forms an anisotropic melt phase whereby an atypical degree of order is manifest in the molten polymer. The subject polyester readily forms liquid crystals in the melt phase and accordingly exhibits a high tendency for the polymer chains to orient in the shear direction. Such anisotropic properties are manifest at a temperature which is amenable for melt processing to form shaped articles. Such order in the melt may be confirmed by conventional polarized light techniques whereby crossed polarizers are utilized. More specifically, the anisotropic melt phase may conveniently be confirmed by the use of a Leitz polarizing microscope at a magnification of 40× with the sample on a Leitz hot stage and under a nitrogen atmosphere. The polymer melt is optically anisotropic, i.e., it transmits light when examined between crossed polarizers. The amount of light transmitted increases when the sample is optically anisotropic even in the static state.

The wholly aromatic polyester of the present invention may be formed by a variety of ester-forming techniques whereby organic monomer compounds possessing functional groups which upon condensation form the requisite recurring moieties are reacted. For instance, the functional groups of the organic monomer compounds may be carboxylic acid groups, hydroxyl groups, ester groups, acyloxy groups, acid halides, etc. The organic monomer compounds may be reacted in the absence of a heat exchange fluid via a melt acidolysis procedure. They, accordingly, may be heated initially to form a melt solution of the reactants wherein reactants such as terephthalic acid initially are present as solids with the reaction continuing as solid polymer particles are formed and suspended therein. A vacuum may be applied to facilitate removal of volatiles formed during the final stage of the condensation (e.g., acetic acid or water).

In commonly assigned U.S. Pat. No. 4,067,852 of Gordon W. Calundann, entitled "Improved Melt Processable Thermotropic Wholly Aromatic Polyester and Process for Its Production" is described another slurry polymerization process which may be employed to form the wholly aromatic polyester of the present invention wherein the solid product is suspended in a heat exchange medium. The disclosure of this copending application is herein incorporated by reference.

When employing either the melt acidolysis procedure or the slurry procedure of U.S. Pat. No. 4,067,852 the organic monomer reactants from which the 6-oxy-2-naphthoyl moiety (i.e., moiety I), and the dioxy aryl moiety (i.e., moiety II), are derived may be initially provided in a modified form whereby the usual hydroxyl groups of these monomers are esterified (i.e., they are provided as acyl esters). For instance, lower acyl esters of 6-hydroxy-2-naphthoic acid, and hydroquinone, wherein the hydroxy groups are esterified may be provided as reactants. The lower acyl groups preferably have from about 2 to about 4 carbon atoms. Preferably the acetate esters of the organic compounds which form moieties I, and II are provided. Accordingly, particularly preferred reactants for the condensation reaction are 6-acetoxy-2-naphthoic acid, and hydroquinone diacetate.

Representative catalysts which optionally may be employed in either the melt hydrolysis procedure or in the procedure of U.S. Pat. No. 4,067,852 include dialkyl tin oxide (i.e., dibutyl tin oxide), diaryl tin oxide, titanium dioxide, alkoxy titanium silicates, titanium alkoxides, alkali and alkaline earth metal salts of carboxylic acids (e.g., sodium acetate), the gaseous acid catalysts such as Lewis acids (e.g., $BF_3$), hydrogen halides (e.g., HCl), etc. The quantity of catalyst utilized typically is about 0.001 to 1 percent by weight based upon the total monomer weight, and most commonly about 0.01 to 0.2 percent by weight.

The molecular weight of a previously formed wholly aromatic polyester may be further increased via a solid state polymerization procedure wherein the particulate polymer is heated in an inert atmosphere (e.g., in a nitrogen atmosphere at a temperature of about 260° C. for 10 to 12 hours.

The wholly aromatic polyester of the present invention readily can be melt processed to form a variety of shaped articles, e.g., molded three-dimensional articles, fibers, films, tapes, etc. The polyester of the present invention is suited for molding applications and may be molded via standard injection molding techniques commonly utilized when forming molded articles. Unlike the wholly aromatic polyesters commonly encountered in the prior art it is not essential that more severe injection molding conditions (e.g., higher temperatures), compression molding, impact molding, or plasma spraying techniques be utilized. Fibers or films may be melt extruded.

A molding compound may be formed from the wholly aromatic polyester of the present invention which incorporates approximately 1 to 60 percent by weight of a solid filler (e.g., talc) and/or reinforcing agent (e.g., glass fibers).

The wholly aromatic polyester also may be employed as a coating material which is applied as a powder or from a liquid dispersion.

When forming fibers and films the extrusion orifice may be selected from among those commonly utilized during the melt extrusion of such shaped articles. For instance, the shaped extrusion orifice may be in the form of a rectangular slit (i.e., a slit die) when forming a polymeric film. When forming a filamentary material the spinneret selected may contain one and preferably a plurality of extrusion orifices. For instance, a standard conical spinneret containing 1 to 2000 holes (e.g., 6 to 1500 holes) such as commonly used in the melt spinning of polyethylene terephthalate, having a diameter of about 1 to 60 mils (e.g., 5 to 40 mils) may be utilized. Yarns of about 20 to 200 continuous filaments are commonly formed. The melt-spinnable wholly aromatic polyester is supplied to the extrusion orifice at a temperature above its melting point, e.g., a temperature of about 300° to 320° C. in preferred embodiments.

Subsequent to extrusion through the shaped orifice the resulting filamentary material or film is passed in the direction of its length through a solidification or quench zone wherein the molten filamentary material or film is transformed to a solid filamentary material or film. The resulting fibers commonly have a denier per filament of about 1 to 50, and preferably a denier per filament of about 1 to 20.

The resulting filamentary material or film optionally may be subjected to a thermal treatment whereby its physical properties are further enhanced. The tenacity of the fiber or film generally is increased by such thermal treatment. More specifically, the fibers or films preferably may be thermally treated in an inert atmosphere (e.g., nitrogen, argon, helium) or alternatively in a flowing oxygen-containing atmosphere (e.g., air) with or without stress at a temperature below the polymer melting point until the desired property enhancement is achieved. Thermal treatment times commonly range from a few minutes to several days. As the fiber is thermally treated, its melting temperature progressively is raised. The temperature of the atmosphere may be staged or continuously increased during the thermal treatment or held at a constant level. For instance, the fiber may be heated at 250° C. for one hour, at 260° C. for one hour, and at 270° C. for one hour. Alternatively, the fiber may be heated at about 10° to 20° C. below the temperature at which it melts for about 45 hours. Optimum heat treatment conditions will vary with the specific composition of the wholly aromatic polyester and with the fiber's process history.

The as-spun fibers formed from the wholly aromatic polyester of the present invention are fully oriented and exhibit highly satisfactory physical properties which render them highly suitable for use in high performance applications. The as-spun fibers commonly exhibit an average single filament tenacity of at least 5 grams per denier (e.g., about 5 to 15 grams per denier), and average single filament tensile modulus of at least about 300 grams per denier (e.g., about 300 to 1000 grams per denier), and exhibit an extraordinary dimensional stability at elevated temperature (e.g., at temperatures of about 150° to 200° C.). Following thermal treatment (i.e., annealing) the fibers commonly exhibit an average single filament tenacity of at least 10 grams per denier (e.g., 10 to 30 grams per denier), and an average single filament tensile modulus of at least 300 grams per denier measured at ambient conditions (e.g., 72° F. and 65 percent relative humidity). Such properties enable the fibers to be used with particular advantage as tire cords and in other industrial applications, such as conveyor belts, hose, cabling, resin reinforcement, etc. Films formed of the wholly aromatic polyester of the present invention may be used as strapping tape, cable wrap, magnetic tape, electric motor dielectric film, etc. The fibers and films exhibit an inherent resistance to burning.

The following example is presented as a specific illustration of the claimed invention. It should be understood, however, that the invention is not limited to the specific details set forth in the example.

EXAMPLE

To a 300 ml. three-neck flask fitted with an oil-sealed glass paddle stirrer, a gas inlet tube, distillation head, and condenser leading to a measuring cylinder were added the following in the order indicated:

(a) 12.45 grams terephthalic acid (0.075 mole),
(b) 80.50 grams 6-acetoxy-2-naphthoic acid (0.350 mole),
(c) 15.00 grams hydroquinone diacetate (0.077 mole), and
(d) 0.20 gram sodium acetate catalyst.

The flask was heated to 250° C. in an oil bath with stirring while a slow stream of argon passed through the system to purge air. Acetic acid soon began to distill over as the reaction commenced, and its rate of evolution was observed from the volume collected in the measuring cylinder. After 45 minutes the temperature was raised to 280° C. and was held there for 45 minutes. It was then raised to 310° C. and held there for 25 minutes. By this time a total of 27 ml. acetic acid had been evolved (95 percent of theoretical). The temperature was next raised to 320° C., a vacuum of 1.2 mm. Hg was slowly applied, and the mixture was stirred and heated at that temperature for 60 minutes. At the end of this period the melt was viscous, pearly, and tan-colored. The system was vented to atmospheric pressure with argon, the stirrer was withdrawn, and the contents of the flask were left to cool under a slow stream of argon.

The flask containing the wholly aromatic polyester product was broken, the solid polymer removed, the polymer was frozen in liquid nitrogen, and was ground in a mill. The resulting polymer powder was extracted for one hour with acetone in a Soxhlet apparatus, and then was dried.

The inherent viscosity (I.V.) of the polymer was 4.62 as determined in pentafluorophenol solution of 0.1 percent by weight concentration at 60° C. in accordance with the formula $$I.V. = [\ln (\eta rel)/c]$$

where c = concentration of solution (0.1 percent by weight), and $\eta$rel = relative viscosity. When the polymer was subjected to differential scanning calorimetry (20° C./min. heating rate), it exhibited a glass transition temperature of approximately 110° C. and a melt endotherm at about 303° C. The polymer melt was optically anisotropic.

The polymer was micro-melt extruded into a continuous filament through a single hole spinneret at 310° C. The extruded filament was quenched in ambient air (i.e., at 72° F. and 65 percent relative humidity). The as-spun filament was taken-up at a rate of 150 feet per minute.

The resulting as-spun wholly aromatic polyester fiber exhibited the following average single filament properties:

Tenacity (grams per denier): 8.1
Tensile modulus (grams per denier): 590
Elongation (percent): 2.1

Following thermal treatment in a nitrogen stream at 289° C. for 45 hours while in a free to shrink configuration the fiber exhibited the following average single filament properties:

Tenacity (grams per denier): 22.7
Tensile modulus (grams per denier): 510
Elongation (percent): 5.4

The fiber also exhibited a low degree of shrinkage at elevated temperatures and a good retention of tenacity and tensile modulus values at temperatures up to about 150° to 200° C.

Although the invention has been described with a preferred embodiment it is to be understood that variations and modifications may be employed without departing from the concept of the invention as defined in the following claims.

I claim:

1. A melt processable wholly aromatic polyester capable of forming an anisotropic melt phase at a temperature below approximately 400° C. consisting essentially of the recurring moieties I, II, and III which may include substitution of at least some of the hydrogen atoms present upon an aromatic ring wherein:

I is

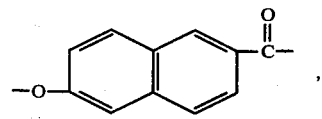

II is a dioxy aryl moiety of the formula +O—Ar—O+
where Ar is a divalent radical comprising at least one aromatic ring, and III is a dicarboxy aryl moiety of the formula

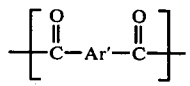

where Ar' is a divalent radical comprising at least one aromatic ring, with said optional substitution if present being selected from the group consisting of an alkyl group of 1 to 4 carbon atoms, an alkoxy group of 1 to 4 carbon atoms, halogen, a phenyl group and mixtures of the foregoing, and wherein said polyester comprises approximately 10 to 90 mole percent of moiety I, approximately 5 to 45 mole percent of moiety II, and approximately 5 to 45 mole percent of moiety III.

2. A melt processable wholly aromatic polyester according to claim 1 which is capable of forming an anisotropic melt phase at a temperature below approximately 350° C.

3. A melt processable wholly aromatic polyester according to claim 1 which is capable of forming an anisotropic melt phase at a temperature below approximately 320° C.

4. A melt processable wholly aromatic polyester according to claim 1 wherein said dioxy aryl moiety II and said dicarboxy aryl moiety III are symmetrically disposed.

5. A melt processable wholly aromatic polyester according to claim 1 wherein said dioxy aryl moiety II is

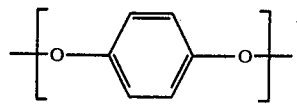

and said dicarboxy aryl moiety III is

6. A melt processable wholly aromatic polyester according to claim 1 wherein each moiety is substantially free of ring substitution.

7. A melt processable wholly aromatic polyester according to claim 1 which comprises approximately 20 to 80 mole percent of moiety I, approximately 10 to 40 mole percent of moiety II, and approximately 10 to 40 mole percent of moiety III.

8. A melt processable wholly aromatic polyester according to claim 1 which exhibits an inherent viscosity of at least 2.5 when dissolved in a concentration of 0.1 percent by weight in pentafluorophenol at 60° C.

9. A melt processable wholly aromatic polyester according to claim 1 which exhibits an inherent viscosity of at least 3.5 when dissolved in a concentration of 0.1 percent by weight in pentafluorophenol at 60° C.

10. A melt processable wholly aromatic polyester according to claim 1 which exhibits an inherent viscosity of 3.5 to 7.5 when dissolved in a concentration of 0.1 percent by weight in pentafluorophenol at 60° C.

11. A fiber which has been melt spun from the wholly aromatic polyester of claim 1.

12. A film which has been melt extruded from the wholly aromatic polyester of claim 1.

13. A molded article comprising the melt processable wholly aromatic polyester of claim 1.

14. A molding compound comprising the melt processable wholly aromatic polyester of claim 1 which incorporates approximately 1 to 60 percent by weight of a solid filler and/or reinforcing agent.

15. A melt processable wholly aromatic polyester capable of forming an anisotropic melt phase at a temperature below approximately 320° C. consisting essentially of the recurring moieties I, II, and III which may include substitution of at least some of the hydrogen atoms present upon an aromatic ring wherein:

I is

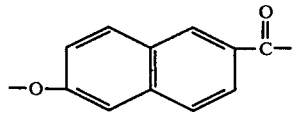

II is a symmetrical dioxy aryl moiety of the formula +O—Ar—O+ where Ar is a divalent radical comprising at least one aromatic ring, and III is a symmetrical dicarboxy aryl moiety of the formula

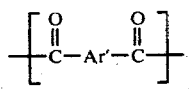

where Ar' is a divalent radical comprising at least one aromatic ring, with said optional substitution if present being selected from the group consisting of an alkyl group of 1 to 4 carbon atoms, an alkoxy group of 1 to 4 carbon atoms, halogen, a phenyl group, and mixtures of the foregoing, and wherein said polyester comprises approximately 20 to 80 mole percent of moiety I, approximately 10 to 40 mole percent of moiety II, and approximately 10 to 40 mole percent of moiety III.

16. A melt processable wholly aromatic polyester according to claim 15 wherein said symmetrical dioxy aryl moiety II is selected from the group consisting of:

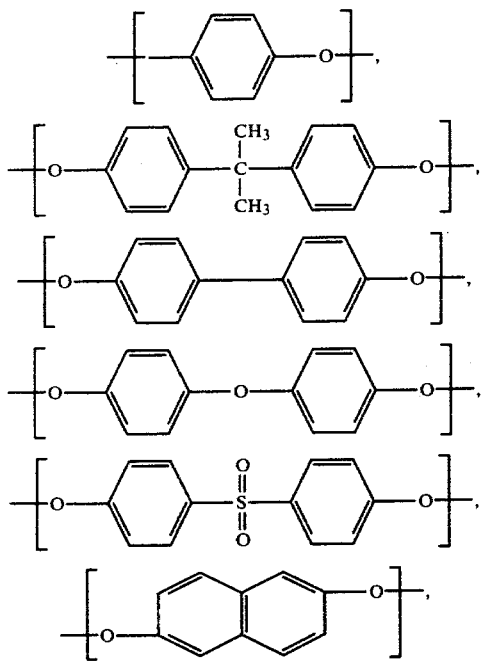

and mixtures of the foregoing.

17. A melt processable wholly aromatic polyester according to claim 15 wherein said symmetrical dicarboxy aryl moiety III is selected from the group consisting of:

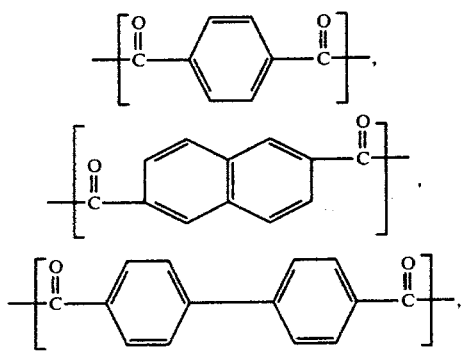

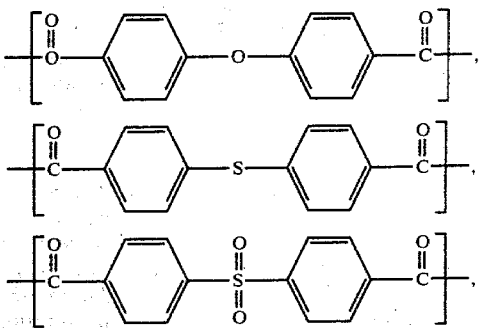

and mixtures of the foregoing.

18. A melt processable wholly aromatic polyester according to claim 15 wherein each moiety is substantially free of ring substitution.

19. A melt processable wholly aromatic polyester according to claim 15 which comprises approximately 60 to 80 mole percent of moiety I, approximately 10 to 20 mole percent of moiety II, and approximately 10 to 20 mole percent of moiety III.

20. A melt processable wholly aromatic polyester according to claim 15 which exhibits an inherent viscosity of at least 2.5 when dissolved in a concentration of 0.1 percent by weight in pentafluorophenol at 60° C.

21. A melt processable wholly aromatic polyester according to claim 15 which exhibits an inherent viscosity of at least 3.5 when dissolved in a concentration of 0.1 percent by weight in pentafluorophenol at 60° C.

22. A melt processable wholly aromatic polyester according to claim 15 which exhibits an inherent viscosity of 3.5 to 7.5 when dissolved in a concentration of 0.1 percent by weight in pentafluorophenol at 60° C.

23. A fiber which has been melt spun from the wholly aromatic polyester of claim 15.

24. A film which has been melt extruded from the wholly aromatic polyester of claim 15.

25. A molded article comprising the melt processable wholly aromatic polyester of claim 15.

26. A molding compound comprising the melt processable wholly aromatic polyester of claim 15 which incorporates approximately 1 to 60 percent by weight of a solid filler and/or reinforcing agent.

27. A melt processable wholly aromatic polyester capable of forming an anisotropic melt phase at a temperature below approximately 320° C. consisting essentially of the recurring moieties I, II, and III wherein:

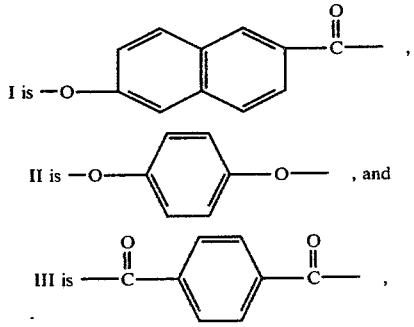

said moieties being substantially free of ring substitution, and wherein said polyester comprises approximately 20 to 80 mole percent of moiety I, approximately 10 to 40 mole percent of moiety II, and approximately 10 to 40 mole percent of moiety III.

28. A melt processable wholly aromatic polyester according to claim 27 which comprises approximately 60 to 80 mole percent of moiety I, approximately 10 to 20 mole percent of moiety II, and approximately 10 to 20 mole percent of moiety III.

29. A melt processable wholly aromatic polyester according to claim 27 which exhibits an inherent viscosity of at least 2.5 when dissolved in a concentration of 0.1 percent by weight in pentafluorophenol at 60° C.

30. A melt processable wholly aromatic polyester according to claim 27 which exhibits an inherent viscosity of at least 3.5 when dissolved in a concentration of 0.1 percent by weight in pentafluorophenol at 60° C.

31. A melt processable wholly aromatic polyester according to claim 27 which exhibits an inherent viscosity of 3.5 to 7.5 when dissolved in a concentration of 0.1 percent by weight in pentafluorophenol at 60° C.

32. A fiber which has been melt spun from the wholly aromatic polyester of claim 27.

33. A film which has been melt extruded from the wholly aromatic polyester of claim 27.

34. A molded article comprising the melt processable wholly aromatic polyester of claim 27.

35. A molding compound comprising the melt processable wholly aromatic polyester of claim 27 which incorporates approximately 1 to 60 percent by weight of a solid filler and/or reinforcing agent.

* * * * *

UNITED STATES PATENT AND TRADEMARK OFFICE
CERTIFICATE OF CORRECTION

PATENT NO. : 4,256,624
DATED : March 17, 1981
INVENTOR(S) : Gordon W. Calundann

It is certified that error appears in the above—identified patent and that said Letters Patent is hereby corrected as shown below:

Column 4, between lines 42 and 46, delete 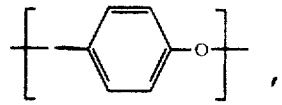 , and insert 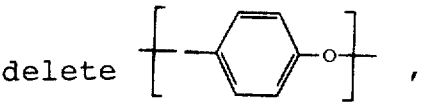 .

Column 13, between lines 23 and 27, delete 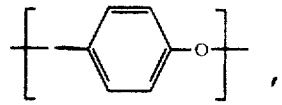 , and insert 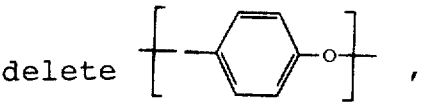 .

Signed and Sealed this

Twenty-fifth Day of May 1982

[SEAL]

Attest:

GERALD J. MOSSINGHOFF

Attesting Officer     Commissioner of Patents and Trademarks